United States Patent
Koehler et al.

(10) Patent No.: US 12,319,213 B2
(45) Date of Patent: Jun. 3, 2025

(54) CROSS-MEMBER ARRANGEMENT FOR A BATTERY-POWERED ELECTRIC VEHICLE

(71) Applicant: Bayerische Motoren Werke Aktiengesellschaft, Munich (DE)

(72) Inventors: Arne Koehler, Pliening (DE); Roland Lang, Asbach-Baeumenheim (DE); Lin Moellenhoff, Odelzhausen (DE); Mark Muehlhausen, Woerth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 498 days.

(21) Appl. No.: 17/761,831

(22) PCT Filed: Oct. 6, 2020

(86) PCT No.: PCT/EP2020/077907
§ 371 (c)(1),
(2) Date: Mar. 18, 2022

(87) PCT Pub. No.: WO2021/078504
PCT Pub. Date: Apr. 29, 2021

(65) Prior Publication Data
US 2022/0332266 A1    Oct. 20, 2022

(30) Foreign Application Priority Data
Oct. 21, 2019   (DE) .............. 10 2019 128 374.4

(51) Int. Cl.
*B60R 19/18*     (2006.01)
*B60R 19/04*     (2006.01)

(52) U.S. Cl.
CPC .............. *B60R 19/18* (2013.01); *B60R 19/04* (2013.01); *B60R 2019/1806* (2013.01)

(58) Field of Classification Search
CPC ..... B60Y 2306/01; B60R 19/04; B60R 19/18; B60R 19/34; B60R 2019/1806;
(Continued)

(56) References Cited

U.S. PATENT DOCUMENTS 3,506,295 A * 4/1970 Yancey ............... B60R 19/18
                                              181/207
4,961,603 A * 10/1990 Carpenter ........... B60R 19/18
                                              293/154
(Continued)

FOREIGN PATENT DOCUMENTS

CN   203237190 U   10/2013
CN   103921746 A    7/2014
(Continued)

OTHER PUBLICATIONS

EP-0945328-A2 computer translation (Year: 1999).*
(Continued)

*Primary Examiner* — Amy R Weisberg
*Assistant Examiner* — Wenwei Zhuo
(74) *Attorney, Agent, or Firm* — Crowell & Moring LLP

(57) ABSTRACT

A cross-member arrangement for a bumper assembly on a motor vehicle includes a first deformation element mounting and a second deformation element mounting, a forward cross-member profile, which is connected to each of the two deformation element mountings, a rear cross-member profile, which is connected to each of the two deformation element mountings. A bumper assembly for a battery-powered motor vehicle includes one deformation element for bracing the bumper assembly against a front end of the motor vehicle arranged on each side of a central longitudinal axis of the motor vehicle.

12 Claims, 2 Drawing Sheets

(58) Field of Classification Search
CPC ............ B60R 2019/1826; B60R 19/36; B60R 19/023; B60R 2019/247; B60R 2019/242; B60R 2019/1893; B60R 2019/1866
USPC .................................. 293/133, 132, 151, 152
See application file for complete search history.

(56) References Cited

U.S. PATENT DOCUMENTS

| | | | | |
|---|---|---|---|---|
| 5,806,901 | A * | 9/1998 | Tennyson | B60R 19/30 293/122 |
| 6,435,579 | B1 * | 8/2002 | Glance | B60R 19/34 293/123 |
| 2005/0104392 | A1 * | 5/2005 | Liebhard | B60R 19/18 293/132 |
| 2013/0175829 | A1 * | 7/2013 | Kim | B60L 50/64 296/204 |
| 2017/0144618 | A1 * | 5/2017 | Martini | B60R 19/03 |
| 2021/0380056 | A1 * | 12/2021 | Gunaydin | B60R 19/18 |
| 2024/0025480 | A1 * | 1/2024 | Mikazuki | B62D 21/157 |

FOREIGN PATENT DOCUMENTS

| | | | | |
|---|---|---|---|---|
| CN | 104691465 | A | | 6/2015 |
| CN | 106143372 | A * | 11/2016 | |
| CN | 219295359 | U * | 7/2023 | |
| DE | 198 53 128 | A1 | 5/2000 | |
| DE | 202009006345 | U1 * | 10/2010 | ............ B60D 1/485 |
| EP | 0945328 | A2 * | 9/1999 | |
| EP | 1 291 247 | A1 | 3/2003 | |
| FR | 2871122 | A1 * | 12/2005 | ............ B60R 19/48 |
| FR | 2876332 | A1 * | 4/2006 | ............ B60R 19/12 |
| WO | WO 2007/050967 | A1 | 5/2007 | |
| WO | WO-2019043260 | A1 * | 3/2019 | ............ B60R 19/12 |

OTHER PUBLICATIONS

English translation of Chinese-language Office Action issued in Chinese Application No. 202080066704.2 dated May 30, 2023 (8 pages).

International Search Report (PCT/ISA/210) issued in PCT Application No. PCT/EP2020/077907 dated Nov. 9, 2020 with English translation (five (5) pages).

German-language Written Opinion (PCT/ISA/237) issued in PCT Application No. PCT/EP2020/077907 dated Nov. 9, 2020 (six (6) pages).

German-language Search Report issued in German Application No. 10 2019 128 374.4 dated Jun. 29, 2020 with partial English translation (14 pages).

* cited by examiner

CROSS-MEMBER ARRANGEMENT FOR A BATTERY-POWERED ELECTRIC VEHICLE

BACKGROUND AND SUMMARY

The invention relates to a crossmember arrangement for a bumper assembly of a motor vehicle and to a bumper assembly for, for example, a battery electrically operated motor vehicle having such a crossmember arrangement.

For the design of a front end of respective passive safety, two virtually redundant load paths are designed for energy dissipation in a vehicle.

In load cases with full overlap or partial overlap, the energy is absorbed via the impact damper(s) and the engine supports connected thereto. In load cases with a pointwise load application point (for example "pole center" load case), the energy is transmitted into the bulkhead via the more or less rigid engine block of the internal combustion engine.

In the case of vehicles without an internal combustion engine (battery electric vehicles, BEVs), the engine block is absolute in this chain of action. In order nevertheless to ensure an equivalent passenger protection in the pole center load case, there are various approaches. One of them is to design the bumper crossmember with a bending strength which allows sufficient load transmission from the center of the crossmember (load application point) to the position of the impact dampers in the vehicle transverse direction as lateral deformation elements.

For vehicles having a crash weight of around 2500 kg, such crossmembers made of high-strength steel weigh up to 20 kg on account of the high sheet metal thicknesses which are required for such a bending strength. However, such a high weight of the bumper crossmember is undesired.

Against this background, it is an object of the invention to improve a crossmember arrangement of a bumper.

This object is achieved by a crossmember arrangement and by a bumper assembly in accordance with the independent claims. The dependent claims relate to advantageous developments of the invention.

According to one aspect, a crossmember arrangement for a bumper assembly of a motor vehicle is provided. The crossmember arrangement comprises at least:
  a) a first deformation element receptacle, in particular for receiving a first deformation element which is arranged on a first side of a longitudinal center axis of the vehicle, and a second deformation element receptacle, in particular for receiving a second deformation element which is arranged on a second side of a longitudinal center axis of the vehicle. The deformation element receptacles can each be formed with a bent sheet metal part. A deformation element of the motor vehicle can be fitted onto the receptacle or be inserted into the receptacle and then, for example, be welded or screwed thereto, with the result that forces and possibly moments from crash loads can be transmitted at the receptacle;
  b) a front crossmember profile which is connected to each of the two deformation element receptacles, in particular fixedly, that is to say in particular not releasably in a destruction-free manner, and extends in particular at least between the first deformation element receptacle and the second deformation element receptacle. The front crossmember profile is preferably a closed or an open hollow profile which is in particular welded to each of the two deformation element receptacles;
  c) a rear crossmember profile which is connected to each of the two deformation element receptacles, in particular fixedly, that is to say in particular not releasably in a destruction-free manner, and extends in particular at least between the first deformation element receptacle and the second deformation element receptacle. The rear crossmember profile is preferably a closed or an open hollow profile which is connected, in particular welded, to each of the two deformation element receptacles;
  d) at least one connecting profile which mutually supports the front crossmember profile and the rear crossmember profile and for this purpose is connected to each of the two crossmember profiles, in particular fixedly, that is to say in particular not releasably in a destruction-free manner. The connecting profile is preferably a hollow box profile which is connected, in particular welded, respectively at its longitudinal ends to the front crossmember profile and the rear crossmember profile.

According to one embodiment, the front crossmember profile and/or the rear crossmember profile and/or the connecting profile(s) are hollow profiles, in particular rectangular, round or oval hollow profiles or hollow box profiles, each having an open or a closed cross section. In particular, in this embodiment, the hollow profiles used are optimized with the aim of achieving a highest possible bending strength-weight ratio.

According to one aspect of the invention, a bumper assembly for a battery electrically operated motor vehicle is provided, comprising:
  i) on both sides of a center longitudinal axis of the motor vehicle, in each case a deformation element for supporting the bumper assembly against a front end of the motor vehicle, in particular for absorbing crash loads and/or for supporting crash loads against a front axle support or another component of the front end;
  ii) a crossmember arrangement according to the invention; wherein each of the deformation elements is connected, in particular fixedly, to one of the deformation element receptacles of the crossmember arrangement.

The invention is based, inter alia, on the consideration that a replacement of the load transmission action of the internal combustion engine by a crossmember made of high-strength steel which can support central crash loads on the deformation elements (for example impact dampers) arranged on the outside in the transverse direction must have an undesirably high weight in order to perform this function.

The invention is based then, inter alia, on the idea of utilizing the bending stiffness of lattice structures, which is high in relation to the intrinsic weight. In order that a suitable lattice can be used, a relatively large installation space is required in the vehicle longitudinal direction for the crossmember arrangement, which is frequently not available in motor vehicles having an internal combustion engine.

By contrast, the present invention utilizes the customarily present installation space in BEVs in the rearward vehicle direction and realizes the crossmember as a lattice structure.

For this purpose, the crossmember arrangement has two profiles (the front and the rear crossmember profile) which connect the impact dampers (deformation elements) to one another. Between the two profiles there are situated short profiles, which describe a lattice structure.

The "shoes" (deformation element receptacles), which constitute the attachment of the crossmember arrangement to the impact dampers, can be, for example, bent sheet metal parts and/or be formed as a constituent part of the lattice structure.

According to one embodiment, the depth of the crossmember (that is to say in particular the maximum spacing of the front and the rear crossmember profile from one another plus the respective profile cross section in the vehicle longitudinal direction) is chosen in such a way that the central load path in the front end is activated as soon as the impact dampers and the elastic-plastic travel of the crossmember are used up. For this purpose, in particular the load level of the lattice structure is, according to one embodiment, designed in such a way that it is higher than that of the deformation elements and lower than that of the central load path in the front end (that is to say for example the front axle support).

In other words: in the case of a correspondingly strong, central impact with a pole, there is first of all deformation of the deformation elements of the bumper on which the crossmember arrangement of the bumper is supported. If the damping path of the impact dampers is used up and still further crash load has to be absorbed, the lattice of the crossmember arrangement then deforms at a higher load level. If the damping path of the lattice of the crossmember arrangement is used up and yet still further crash load has to be absorbed, the front end then deforms on its central load path at a still higher load level.

It can thus be ensured that, from the moment of the impact, in particular a crash load which becomes stronger with increasing deformation is continuously converted into deformation energy. If for example, according to one embodiment, the rear crossmember profile comes into contact with the front axle support exactly when the deformation travel of the deformation elements is used up, the load absorption by the deformation elements can be directly replaced with the load absorption by the deformation of the lattice structure of the crossmember profile, which can then be supported via its rear crossmember profile on the front axle support.

Depending on the application case, the lattice-like design can, with the same function, allow a weight saving in relation to known crossmembers of above 50%, but at least 30%.

By virtue of a larger component depth between the impact dampers it is possible, according to one embodiment, for the load in the event of a crash with full overlap to be introduced earlier into the structures between the motor supports than is the case with known crossmembers.

Through the controlled failure of the lattice structure, it is possible, in particular in the pole center load case, for additional energy to be dissipated.

In order, in an application-specific manner, to achieve a desired load level, according to one embodiment there are provided a plurality of connecting profiles which are arranged symmetrically with respect to a center longitudinal axis of the crossmember arrangement.

To improve the bending strength, according to one embodiment the connecting profiles are connected to each of the two crossmember profiles at a slant angle, in particular with respect to a cross section defined by the spacing of the two crossmember profiles.

To improve the bending strength-weight ratio of the crossmember arrangement, according to one embodiment the two crossmember profiles and the connecting profiles together form a lattice structure, that is to say in particular that a cross section defined by the spacing of the two crossmember profiles is divided, at least in subregions, into partial cross sections which at least substantially have a triangular shape.

What is to be understood here by a lattice structure in the present case is in particular also a structure in which the individual lattice bars can also be formed as profiles, in particular as hollow profiles, and/or in which the connections between the individual bars or profiles can transmit not only forces but also moments. For example, reference is also made in the present case to a lattice structure when different profiles are welded to one another. The term lattice structure refers in the present case in particular to the division of the entire cross section into triangular or triangle-like partial cross sections. In particular, the crossmember arrangements presented in the exemplary embodiments are to be understood in the present case as lattice structures.

In order, in a crash situation, to be able to provide a further crumple zone subsequent to a complete deformation of the deformation elements before a deformation of the front end, according to one embodiment the two crossmember profiles are spaced apart from one another—in particular along a part of their extent or along their entire extent—between the two deformation element receptacles. The spacing is preferably, in particular centrally between the two deformation element receptacles, a multiple of the profile cross section of the front and/or rear crossmember profile.

In order to improve the bending strength, according to one embodiment the spacing has a maximum centrally between the two deformation element receptacles.

To provide a largest possible crumple zone (and utilizing the installation space which in BEVs is available through the lack of an internal combustion engine), according to one embodiment the front crossmember profile is arranged forwardly and the rear crossmember profile rearwardly of an imaginary, straight connecting line between the two deformation element receptacles, in particular along a part of their extent or along substantially their entire extent between the deformation element receptacles.

For improved pedestrian protection, according to one embodiment the front crossmember profile has a continuous, that is to say in particular bend-free, curvature, which is constant or nonconstant along its longitudinal extent, about a vertical axis of the crossmember arrangement.

For an improved support of the connecting profiles on the rear crossmember profile and a thus improved bending stiffness, according to one embodiment the rear crossmember profile has one or more bending points at which it is curved about a vertical axis of the crossmember arrangement. To improve the stiffness of the crossmember arrangement, according to one embodiment the rear crossmember profile is designed to be straight, that is to say in particular without curvature, beyond the bending points, at least with respect to the vertical axis. In particular, a connecting profile is connected to the rear crossmember profile at at least one bending point, in particular at all of the bending points.

Further advantages and application possibilities of the invention will result from the following description in conjunction with the figures.

DETAILED DESCRIPTION OF THE DRAWINGS

Figure 1:
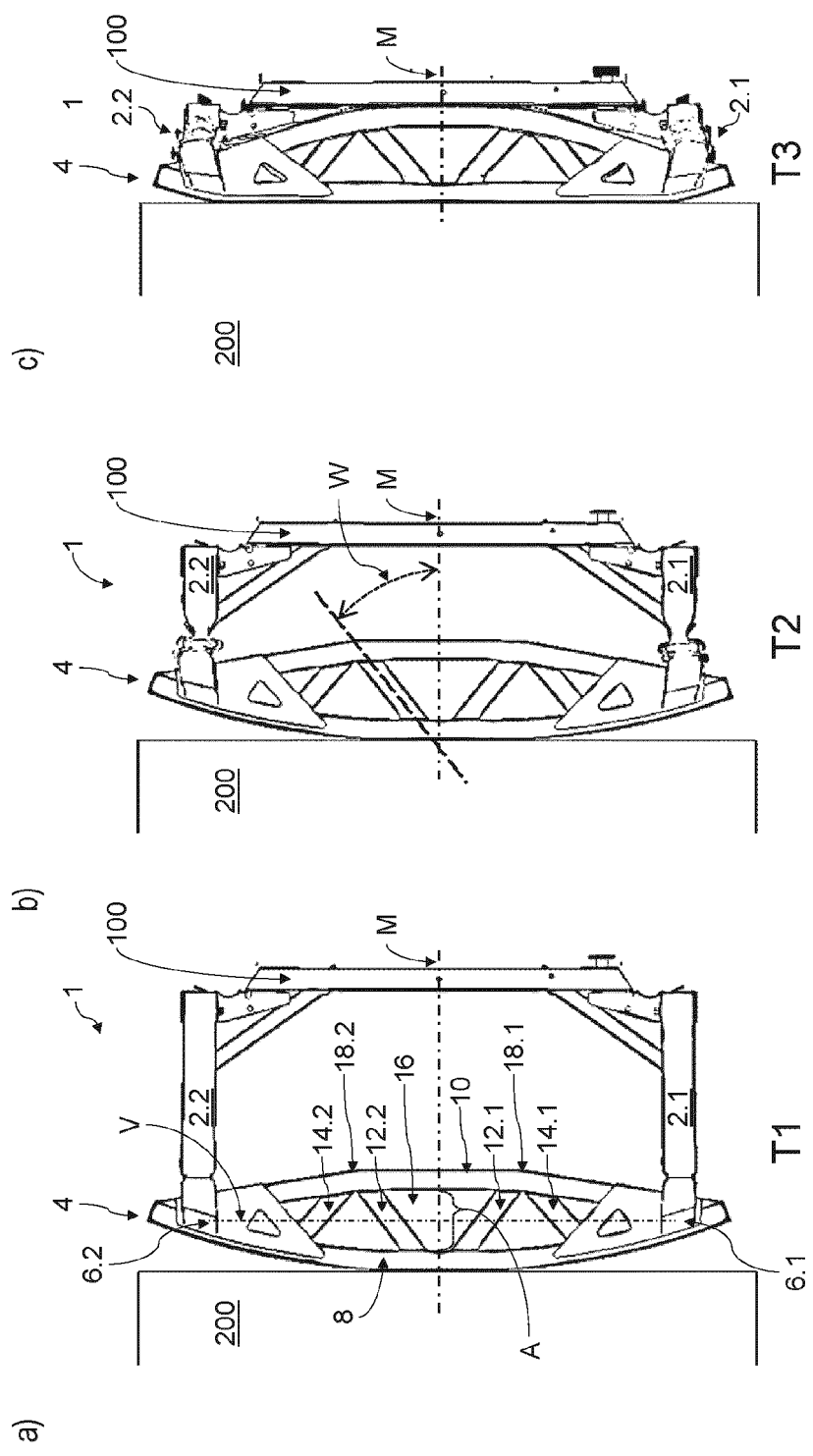
FIGS. 1a-1c show a bumper assembly having a crossmember arrangement according to one exemplary embodiment of the invention in a crash situation with complete overlap with the obstacle.
Figure 2:
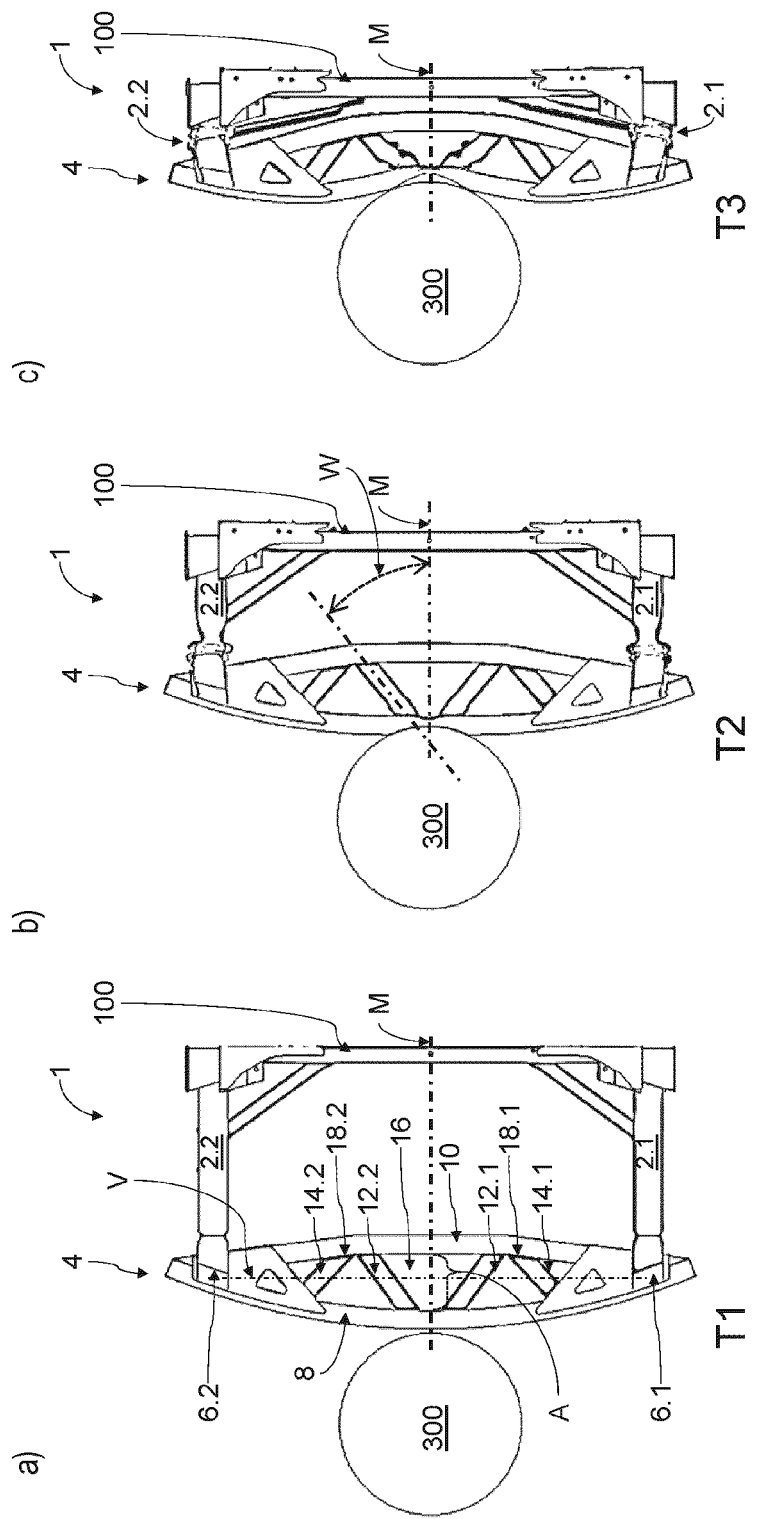
FIGS. 2a-2c show the bumper assembly from FIG. 1 in another crash situation in which the obstacle is a centrally impinging pole.

FIGS. 1 and 2 show a lower bumper assembly 1 for a battery electrically operated motor vehicle (BEV), of which only a front axle support 100 in the front end is illustrated.

The bumper assembly 1 has, on both sides of a center longitudinal axis x of the motor vehicle (and thus also of the bumper assembly 1), in each case a deformation element 2.1 or 2.2 for supporting the bumper assembly 1 with respect to the front axle support 100. The deformation element 2.1 is an impact damper arranged to the left of the center longitudinal axis x; the deformation element 2.2 is an impact damper arranged to the right of the center longitudinal axis x.

The bumper assembly 1 additionally has a crossmember arrangement 4, wherein each of the deformation elements 2 is welded to a deformation element receptacle 6.1 or 6.2 of the crossmember arrangement 4.

The deformation element receptacles 6 are formed as bent sheet metal parts, in order to assist fault-free mounting preferably in such a way that the respective deformation element 2 is first of all introduced into the receptacle up to a provided stop and then welded.

The crossmember arrangement 4 has a front crossmember profile 8 which is formed as a hollow profile with a closed, rounded rectangular cross section and is welded to each of the two deformation element receptacles 6.1 and 6.2. The front crossmember profile 8 is at least for the most part arranged forwardly of an imaginary, straight connecting line V between the two deformation element receptacles 6.1 and 6.2. The front crossmember profile 8 additionally has a continuous curvature about a vertical axis Z of the crossmember arrangement, in particular to allow good pedestrian protection.

In addition, the crossmember arrangement 4 has a rear crossmember profile 10 which is likewise formed as a hollow profile with a closed, rounded rectangular cross section and is welded to each of the two deformation element receptacles 6.1 and 6.2. The rear crossmember profile 10 is at least for the most part arranged rearwardly of an imaginary, straight connecting line V between the two deformation element receptacles 6.1 and 6.2.

Consequently, the two crossmember profiles 8 and 10 are spaced apart from one another between the two deformation element receptacles 6, wherein the spacing A beyond the deformation element receptacles 6 becomes larger with increasing closeness to the center longitudinal axis and has a maximum at the center longitudinal axis M (that is to say centrally between the two deformation element receptacles 6).

In addition, the crossmember arrangement 4 has a plurality of connecting profiles 12.1, 12.2, 14.1 and 14.2, wherein each of these connecting profiles 12 or 14 supports the front crossmember profile 8 and the rear crossmember profile 10 with respect to one another and for this purpose is welded to both crossmember profiles 8 and 10. The connecting profiles 12 and 14 are each formed as hollow box profiles with a closed, rounded rectangular cross section.

The two crossmember profiles 8 and 10 and the connecting profiles 12 and 14 together form a lattice structure 16 in that a cross section, which is divided by the spacing A of the two crossmember profiles 8 and 10, is divided, at least in subregions, into partial cross sections which at least substantially have a triangular shape.

The rear crossmember profile 10 has two bending points 18.1 and 18.2 at which it is curved about a vertical axis Z of the crossmember arrangement 4. Each of the bending points 18 is arranged at a node of the lattice structure 16, wherein the connecting profiles 12.1 and 14.1 are welded to the rear crossmember profile 10 at the bending point 18.1, and the connecting profiles 12.2 and 14.2 are welded to the rear crossmember profile 10 at the bending point 18.2. The rear crossmember profile 10 has no curvature beyond the bending points 18, at least with respect to the vertical axis Z.

FIGS. 1a-1c illustrate a deformation behavior of the bumper assembly 1 with respect to the front axle support 100 in the event of a crash with an obstacle 200, which—in the transverse direction Y—is completely overlapping, over time. FIG. 1a here shows the impact timepoint T1, FIG. 1b shows a later timepoint T2 (for example 15 ms (milliseconds) later) and FIG. 1c shows an even later timepoint T3 (for example 30 ms later).

The load level of the lattice structure 16 is chosen such that it is higher than that of the deformation elements 2 and lower than that of the central load path in the front axle support 100.

As can be gathered from FIG. 1b, first of all the lattice structure 16 therefore remains substantially nondeformed after the impact with the obstacle 200 (cf. FIG. 1a). However, the deformation elements 2 on which the lattice structure 16 of the crossmember arrangement 4 is supported already absorb a crash load and correspondingly deform with the formation of buckling, starting from a predetermined failure point (constriction) visible in FIG. 1a.

FIG. 1c shows the further progression of the load absorption: if the deformation possibility of the deformation elements 2 is used up, there then begins the load absorption and hence deformation of the lattice structure 16 of the crossmember arrangement 4.

In the exemplary embodiment, the depth of the crossmember arrangement 4 (that is to say the spacing A between the front crossmember profile 8 and the rear crossmember profile 10 plus the respective profile extents) is chosen in such a way that the rear crossmember profile 10 butts against the front axle support 100 as soon as the deformation possibility of the crossmember arrangement 4 is used up.

It is thus possible, if necessary, for further absorption of crash load by the front axle support 100 to occur directly (that is to say at least substantially without a time lag).

FIGS. 2a-2c illustrate a deformation behavior of the bumper assembly 1 with respect to the front axle support 100 in the event of a crash with a centrally impinging pole 300 over time. FIG. 2a here shows the impact timepoint T1, FIG. 2b a later timepoint T2 (for example 18 ms later) and FIG. 2c a later timepoint T3 (for example 36 ms later).

It is also provided in this crash situation that the selected load level of the lattice structure 16 is chosen such that, after the impact with the pole 300 (cf. FIG. 2a), first of all the lattice structure 16 remains substantially nondeformed, whereas the deformation elements 2 already absorb crash load and thereby deform.

FIG. 2c shows the further progression of the load absorption in the "pole center" crash situation: if the deformation possibility of the deformation elements 2 is used up, there then begins the load absorption and hence the deformation of the lattice structure 16 of the crossmember arrangement 4.

The depth of the crossmember arrangement 4 (that is to say the spacing A between the front crossmember profile 8 and the rear crossmember profile 10 plus the respective profile extents) is chosen such that the rear crossmember profile 10, in this crash situation too, butts against the front axle support 100 as soon as the deformation possibility of the crossmember arrangement 4 by means of the pole 300 is used up.

It is thus also possible in a pole crash, if necessary, for a further absorption of crash load to occur via the central load path of the front axle support 100 directly (that is to say at least substantially without a time lag).

In the event of a correspondingly strong, central impact with a pole, there thus deform first of all the deformation elements 2 of the bumper assembly 1, on which the crossmember arrangement 4 is supported with its lattice structure 16. If the damping path of the deformation elements 2 is used up and still further crash load has to be absorbed, the lattice structure 16 of the crossmember arrangement 4 then deforms at its higher load level. If the damping path of the lattice 16 is used up and yet still further crash load has to be absorbed, the front end 100 then deforms on its central load path at its still higher load level.

With a configuration of the bumper assembly 1 as a lower bumper—as in the illustrated exemplary embodiment—there additionally results tilting of the crossmember arrangement 4 about the vehicle transverse axis Y while the deformation elements 2 deform. The bumper assembly 1 can thus also act in the vehicle vertical direction Z in a relatively large region as bumper over the central load path.

LIST OF REFERENCE SIGNS

1 Bumper assembly
2 Deformation element
4 Crossmember arrangement
6 Deformation element receptacle
8 Front crossmember profile
10 Rear crossmember profile
12 Connecting profile
14 Connecting profile
16 Lattice structure
18 Bending point
100 Front axle support
200 Fully overlapping obstacle
300 Pole
A Spacing
M Center longitudinal axis
T Timepoint
V Imaginary, straight connecting line between the two deformation element receptacles
W Slant angle
X Longitudinal direction
Y Transverse direction
Z Vertical direction

What is claimed is:

1. A crossmember arrangement for a bumper assembly of a motor vehicle, comprising:
   a first deformation element receptacle and a second deformation element receptacle, each being configured to receive therein a respective deformation element;
   a front crossmember profile which is connected to each of the two deformation element receptacles;
   a rear crossmember profile which is connected to each of the two deformation element receptacles; and
   a plurality of connecting profiles which support the front crossmember profile and the rear crossmember profile with respect to one another, wherein
   the front crossmember profile, the rear crossmember profile, and the plurality of connecting profiles are hollow profiles,
   the plurality of connecting profiles are arranged symmetrically with respect to a center longitudinal axis of the crossmember arrangement, and
   the front and rear crossmember profiles and the plurality of connecting profiles together form a lattice structure.

2. The crossmember arrangement according to claim 1, wherein
   the front crossmember profile, the rear crossmember profile, and/or the plurality of connecting profiles each have an open or a closed cross section.

3. The crossmember arrangement according to claim 2, wherein
   the hollow profiles are rectangular, round or oval hollow profiles or hollow box profiles.

4. The crossmember arrangement according to claim 1, wherein
   the plurality of connecting profiles are connected to each of the two crossmember profiles at a slant angle.

5. The crossmember arrangement according to claim 1, wherein
   the two crossmember profiles are spaced apart from one another between the two deformation element receptacles.

6. The crossmember arrangement according to claim 5, wherein
   the spacing has a maximum centrally between the two deformation element receptacles.

7. The crossmember arrangement according to claim 1, wherein
   the front crossmember profile is arranged forwardly and the rear crossmember profile rearwardly of an imaginary, straight connecting line between the two deformation element receptacles.

8. The crossmember arrangement according to claim 1, wherein
   the front crossmember profile has a continuous curvature about a vertical axis of the crossmember arrangement.

9. The crossmember arrangement according to claim 1, wherein
   the rear crossmember profile has one or more bending points at which the rear crossmember profile is curved about a vertical axis of the crossmember arrangement.

10. The crossmember arrangement according to claim 9, wherein
    the rear crossmember profile is configured to be straight beyond the bending points, at least with respect to the vertical axis.

11. The crossmember arrangement according to claim 9, wherein
    a connecting profile is connected to the rear crossmember profile at at least one of the bending points.

12. A bumper assembly for a battery electrically operated motor vehicle, comprising:
    first and second deformation elements, each being arranged on a respective side of a center longitudinal axis of the motor vehicle for supporting the bumper assembly against a front end of the motor vehicle; and
    a crossmember arrangement comprising:
       a first deformation element receptacle and a second deformation element receptacle, each being configured to receive a respective one of the first and second deformation elements;
       a front crossmember profile which is connected to each of the two deformation element receptacles;
       a rear crossmember profile which is connected to each of the two deformation element receptacles; and a plurality of connecting profiles which support the front crossmember profile and the rear crossmember profile with respect to one another, wherein the front crossmember profile, the rear crossmember profile, and the plurality of connecting profiles are hollow profiles, the plurality of connecting profiles are arranged symmetrically with respect to a center longitudinal axis of the crossmember arrangement, the front and rear crossmember profiles and the plurality of connecting profiles together form a lattice structure, and the first deformation element is received in and connected to the first deformation element receptacle and the second deformation element is received in and connected to the second deformation element receptacle.

* * * * *